(12) United States Patent
Colombo et al.

(10) Patent No.: US 11,397,273 B2
(45) Date of Patent: Jul. 26, 2022

(54) FULL WAVEFORM INVERSION IN THE MIDPOINT-OFFSET DOMAIN

(71) Applicant: Saudi Arabian Oil Company, Dhahran (SA)

(72) Inventors: Daniele Colombo, Dhahran (SA); Diego Rovetta, Delft (NL); Apostolos Kontakis, Delft (NL); Ernesto Sandoval Curiel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/748,038

(22) Filed: Jan. 21, 2020

(65) Prior Publication Data
US 2021/0190983 A1   Jun. 24, 2021

(30) Foreign Application Priority Data

Dec. 20, 2019 (GR) .............................. 20190100572

(51) Int. Cl.
*G01V 1/36* (2006.01)
*G01V 1/30* (2006.01)

(52) U.S. Cl.
CPC .............. *G01V 1/362* (2013.01); *G01V 1/303* (2013.01); *G01V 2210/52* (2013.01); *G01V 2210/53* (2013.01)

(58) Field of Classification Search
CPC .... G01V 1/362; G01V 1/303; G01V 2210/52; G01V 2210/53

(Continued)

(56) References Cited

U.S. PATENT DOCUMENTS 8,386,218 B2   2/2013 Shin
10,067,255 B2   9/2018 Colombo et al.
(Continued)

FOREIGN PATENT DOCUMENTS

CA     2928955        5/2015
WO  WO 2016193180  12/2016
WO  WO 2017106127   6/2017

OTHER PUBLICATIONS

U.S. Appl. No. 17/237,746 (Year: 2021).*
(Continued)

*Primary Examiner* — Michael P Nghiem
(74) *Attorney, Agent, or Firm* — Fish & Richardson P.C.

(57) ABSTRACT

Methods for full waveform inversion (FWI) in the midpoint-offset domain include using a computer system to sort seismic traces into common midpoint-offset bins (XYO bins). For each XYO bin, a linear moveout correction is applied to a collection of seismic traces within the XYO bin. The collection of seismic traces is stacked to form a pilot trace. The computer system determines a surface-consistent residual static correction for each seismic trace. The computer system determines that the surface-consistent residual static correction for each seismic trace is less than a threshold. Responsive to the determining that the surface-consistent residual static correction is less than the threshold, the computer system stacks the collection of seismic traces to provide the pilot trace. The computer system groups the pilot traces for the XYO bins into a set of virtual shot gathers. The computer system performs one-dimensional FWI based on each virtual shot gather.

18 Claims, 10 Drawing Sheets

(58) Field of Classification Search
USPC .......................................................... 702/14
See application file for complete search history.

(56) References Cited

U.S. PATENT DOCUMENTS

| | | |
|---|---|---|
| 10,386,519 B2 | 8/2019 | Colombo et al. |
| 10,852,450 B2 | 12/2020 | Colombo et al. |
| 2016/0187513 A1 | 6/2016 | Poole et al. |
| 2017/0068008 A1* | 3/2017 | Colombo ............... G01V 1/288 |
| 2017/0176617 A1 | 6/2017 | Colombo et al. |
| 2018/0321405 A1* | 11/2018 | Colombo ............... G01V 1/362 |
| 2018/0372897 A1 | 12/2018 | Colombo et al. |

OTHER PUBLICATIONS

Bakulin and Calvert, "The virtual source method: Theory and case study," Geophysics, 71, 2006, SI139-SI150.

Frisk and Lynch, "Shallow water waveguide characterization using the Hankel transform," The Journal of the Acoustical Society of America, 76(1), 1984, pp. 205-216.

Pratt, "Seismic waveform inversion in the frequency domain. Part 1: Theory and verification in a physical scale model," Geophysics, 64(3), 1999, pp. 888-901.

Shin and Ho Cha, "Waveform inversion in the Laplace—Fourier domain," Geophysical Journal International, 177(3), 2009, pp. 1067-1079.

Tarantola, "Inversion of seismic reflection data in the acoustic approximation," Geophysics, 49(8), 1984, pp. 1259-1266.

PCT International Search Report and Written Opinion in International Appln. No. PCT/US2020/065926, dated Apr. 8, 2021, 14 pages.

Columbo et al., "Fully automated near-surface analysis by surface-consistent refraction method," Geophysics Technology, EXPEC Advanced Research Center, Jul. 2016, 81(4): U39-U49, XP055322388, 11 pages.

Lian X et al., "An Innovative Spark Based Surface Consistent Residual Static Correction Method," 81st EAGE Conference & Exhibition, Jun. 3-6, 2019, London, XP055789492, 6 pages.

U.S. Appl. No. 17/237,746, Colombo et al., filed Apr. 22, 2021.

Sedova et al., "Acoustic Land Full Waveform Inversion on a Broadband Land Dataset: the Impact of Optimal Transport." 81st EAGE Conference and Exhibition 2019. vol. 2019. No. 1. European Association of Geoscientists & Engineers, Jun. 2019, 5 pages.

* cited by examiner

FULL WAVEFORM INVERSION IN THE MIDPOINT-OFFSET DOMAIN

CROSS-REFERENCE TO RELATED PATENT APPLICATIONS

This application claims the benefit of priority to Greek Application No. 20190100572, filed on Dec. 20, 2019, the contents of which are incorporated by reference herein.

TECHNICAL FIELD

This description relates generally to geophysical exploration, and more particularly to seismic surveying and processing of seismic data.

BACKGROUND

The seismic industry has experienced an increase in the number of seismic acquisition channels. The increased number of seismic acquisition channels has led to greater availability of data acquired in seismic surveys. However, conventional seismic data processing and analysis methods can be less useful for handling the increased amounts of data provided by modem seismic acquisition systems. For example, near surface analysis related to the increased size of the seismic datasets can pose challenges. Traditional methods for analysis of the subsurface domain, based on interactive procedures where input of an analyst is required can require time-consuming human intervention for quality control of the data.

SUMMARY

Methods for full waveform inversion (FWI) in the midpoint-offset domain are disclosed. Methods for FWI in the midpoint-offset domain include using a computer system to sort seismic traces into common midpoint-offset bins (XYO bins). For each XYO bin, the computer system applies a linear moveout (LMO) correction to a collection of seismic traces within the XYO bin. The computer system stacks the collection of seismic traces to form a pilot trace. The computer system determines a surface-consistent residual static correction for each seismic trace. The computer system determines that the surface-consistent residual static correction for each seismic trace is less than a threshold. Responsive to the determining that the surface-consistent residual static correction is less than the threshold, the computer system stacks the collection of seismic traces to provide the pilot trace. The computer system groups the pilot traces for the XYO bins into a set of virtual shot gathers. The computer system performs one-dimensional (1D) FWI based on each virtual shot gather of the multiple virtual shot gathers.

BRIEF DESCRIPTION OF THE DRAWINGS

Figures (FIGS. 1A-1B illustrate incident and reflected rays at a common midpoint (CMP) position compared to refracted ray paths.

DETAILED DESCRIPTION

The implementations disclosed provide methods for Full Waveform Inversion (FWI) in the midpoint-offset domain. Automatic quality control of seismic travel time is disclosed in U.S. Pat. No. 10,067,255. Automated near-surface analysis by surface-consistent refraction methods is disclosed in U.S. Patent Application Publication No. 2017/0176617. The implementations disclosed provide robust and accurate velocity models of the subsurface domain. The subsurface domain in arid regions is characterized by sub-horizontal layers having different velocities and, occasionally, complexities, such as karsts (dissolution cavities), dunes, and wadis (surface drainage). The layering of the subsurface domain is often characterized by increased-velocity geological formations (such as carbonates) that are outcroppings or close to the surface. Such geological formations cause velocity reversals that are associated with geo-morphological features. The implementations disclosed provide velocity model reconstruction of the subsurface domain layers to enable accurate seismic data analysis.

Among other benefits and advantages, the methods provide a flexible and integrated framework for FWI in the midpoint-offset domain. The methods provide increased robustness and accuracy in generating velocity models of the subsurface domain for seismic time corrections, obtaining more accurate seismic imaging in the depth domain, or both. The reliability of seismic images is improved, enhancing the discovery of new mineral resources. The methods reduce the computation time for FWI and increase the uniqueness of the results by increasing the signal-to-noise (S/N) ratio of the data. The dimensionality of the problem is also reduced because fewer variables are inverted. Moreover, the methods provide a tool for obtaining accurate three-dimensional (3D) FWI models of the subsurface with reduced computation time.

Figure 1A:
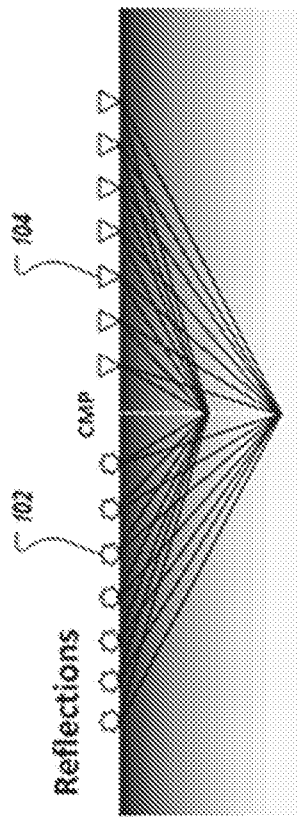
Figure 1B:
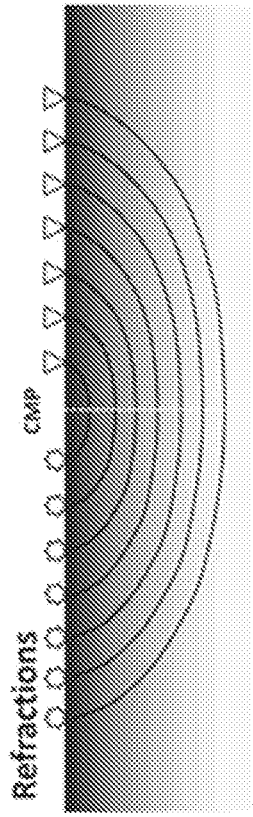
Figure 2B:
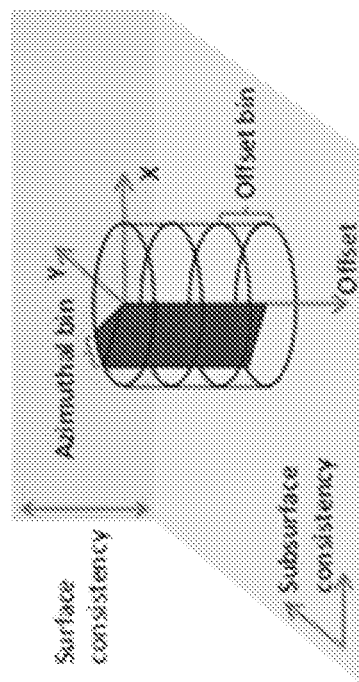
FIG. 2B illustrates seismic trace sorting into CMP-offset-azimuth bins.

FIGS. 1A-1B illustrate incident and reflected rays at a common midpoint (CMP) position compared to refracted ray paths. In the idealized, one-dimensional (1D) model depicted in FIGS. 1A-1B (velocity increasing with depth), the offset (O) between a shot source (for example, source 102) and a receiver (for example, receiver 104) controls the depth of penetration of the refracted waves. For refracted waves, an effective and concise representation of the subsurface structure is obtained by sorting or binning traces in a CMP-offset domain (referred to as XYO binning). After binning the received seismic traces (or the first break picks), statistics are calculated for each bin (for example, mean, median, mode, standard deviation, and cross-correlation). Multidimensional binning is applied to a 3D dataset of seismic traces as shown in FIGS. 2A-2B.

Figure 2A:
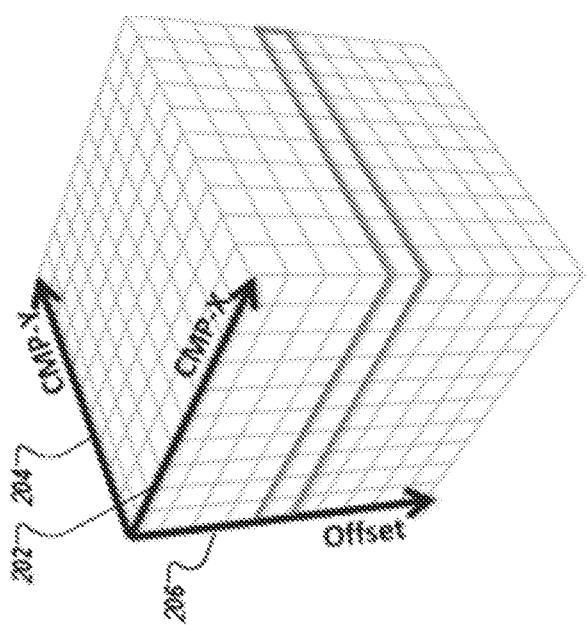
FIG. 2A illustrates seismic trace sorting into CMP-offset bins.

FIG. 2A illustrates seismic trace sorting into CMP-offset bins. The multidimensional attribute cubes or bins are used for quality control since these cubes or bins enable a visualization of the spatial trends of the travel time (mean values) and the noisy areas (standard deviation). When performing the 3D CMP-offset binning (that is, XYO binning in the directions of CMP-X 202, CMP-Y 204, and offset 206), the bin sizes in the CMP-X 202 and CMP-Y 204 directions can be kept greater, such that a sufficient number of CMPs are placed in a bin to provide functionally applicable statistics. The XYO binning illustrated in FIG. 2A is different from sorting in a common offset domain as the latter collects data sharing a common offset but pertaining to different CMPs. The existing CMP sorting (time-offset) that is applied for reflected waves is less useful for refracted waves as it would display events with variable velocities over the offset axis. The XYO binning method is therefore an effective representation of both CMP and offset domains where common properties at a CMP position can be assessed.

In some implementations, as shown in FIG. 2A, the XYO space is divided into XYO cubes or bins of a particular size. For example, each bin can have a size of 100 meters (m) in the CMP-X direction, 100 m in the CMP-Y direction, and 50 m in the offset direction. For each trace (or first break pick), the offset (the distance between the source and the receiver) and the CMP (the middle point position between the source and the receiver) are determined, and the trace is sorted into a particular bin based on the offset and the CMP. Each XYO bin includes a collection of traces sharing a common (or similar) midpoint position and a common (or similar) offset. The collection of traces in an XYO bin is sometimes referred to as an XYO gather.

As an additional dimension of binning, the XYO bin can be further divided into azimuthal sectors (XYOA binning) to provide an additional parameter to the analysis and to implement azimuth-dependent statistics. FIG. 2B illustrates seismic trace sorting into CMP-offset-azimuth bins. The data collected in the CMP-offset-azimuth bin (XYOA bin) can provide structural information in the offset plane (subsurface consistency), while surface-consistent information can be evaluated by analyzing the data across the offset bins. Seismic traces can be sorted into XYOA bins, such that each XYOA bin includes a collection of traces sharing a common (or similar) midpoint position, offset, and azimuth. The collection of traces in an XYOA bin is sometimes referred to as an XYOA gather.

The resulting hypercube or bin in FIGS. 2A-2B provides statistical analysis with increased efficiency for greater volumes of data across multiple domains. The seismic waveforms representing refracted events after application of statics (time shifts) show a sub-horizontal alignment in the XYO bin. The sub-horizontal alignment can be utilized for evaluating the amplitude residuals.

Figure 3:
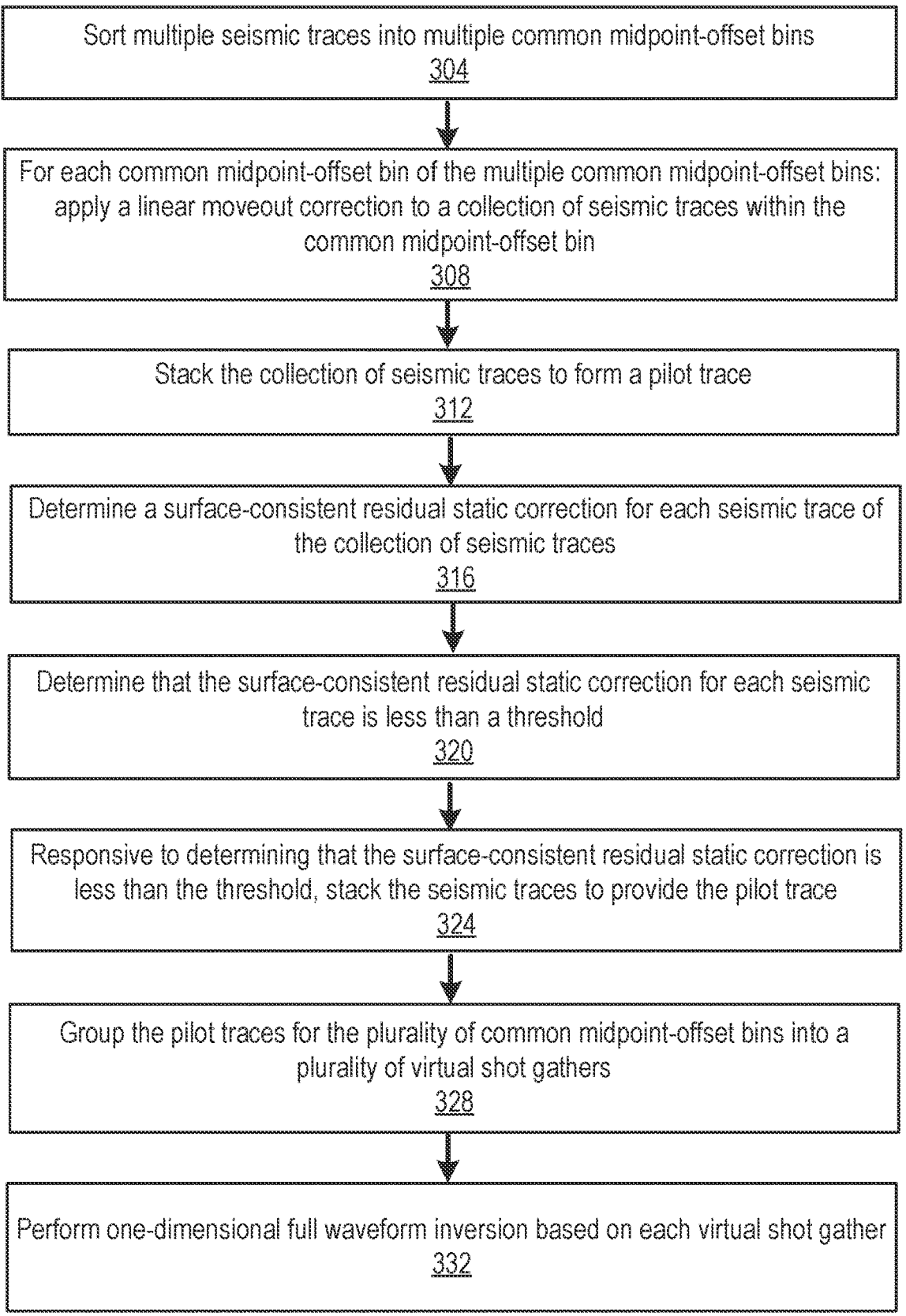
FIG. 3 illustrates a process for generating a virtual shot gather for full waveform inversion (FWI) in the midpoint-offset domain.

FIG. 3 illustrates a process for generating a virtual shot gather for FWI in the midpoint-offset domain. In some implementations, the process is performed by a computer system. Such a computer system is described in more detail at the end of this specification.

In step 304, the computer system sorts multiple seismic traces into multiple common midpoint-offset bins (XYO bins). The seismic data is sorted in the midpoint-offset domain (XYO) where traces are grouped together to form a seismic gather. The seismic traces sorted into each XYO bin have same X, Y, and offset (O) coordinates.

In step 308, for each XYO bin the computer system applies a linear moveout (LMO) correction to a collection of seismic traces within the XYO bin. The collection of seismic traces is obtained from recorded seismic energy travel from multiple seismic sources to multiple seismic receivers during a seismic survey. The dimensional offsets of the multiple seismic receivers can include a common midpoint X axis of the seismic survey, a common midpoint Y axis of the seismic survey, an offset axis, and an azimuth axis. A size of the LMO correction increases as a size of each common midpoint-offset bin increases. For example, the LMO correction is applied to the collection of seismic traces using an apparent velocity derived from a smooth spline fit evaluated at the central offset in the XYO bin. If the lateral velocity variations are small, the gather is generally flat near the first arrival. This property is exploited in order to recover residual statics.

The LMO correction is applied to enable the stacking of the transmitted (or refracted) waveforms. This correction is related to the size of the offset bin (XYO bin)—the greater the size of the offset bin, the greater the effect of the LMO correction. For the end-term case where a size of the offset bin is less enough to contain only one seismic trace, the LMO correction will be null. The LMO correction in the generation of the pilot trace emphasizes the contribution of the transmitted waveforms. For an offset bin having a greater size, the LMO correction will allow the transmitted energy to stack coherently while the reflected energy and the surface waves, that have a different moveout value, will be attenuated.

In step 312, the computer system stacks the collection of seismic traces within each XYO bin to form a pilot trace. The pilot seismic trace is generated from each XYO gather to calculate surface-consistent residual time shifts that are applied to sources and receivers. Step 312 is performed for each XYO bin.

In step 316, the computer system determines a surface-consistent residual static correction for each seismic trace of the collection of seismic traces within each XYO bin. Step 316 is performed for each XYO bin and for each trace of the collection of seismic traces within each XYO bin. To determine the surface-consistent residual static correction, the computer system determines a time shift based on cross-correlation of each seismic trace with the pilot trace. Time shifts are calculated for each seismic trace through cross-correlation to the pilot trace. The computer system provides the surface-consistent residual static correction based on inversion of the time shift for a seismic source position and a seismic receiver position. The time residual for each seismic trace is inverted for the source and receiver positions (surface-consistent).

In step 320, the computer system determines whether the surface-consistent residual static correction for each seismic trace is less than a threshold. In some implementations, the iterative procedure stops when there is no further correction estimated, such as when the further correction is less than or equal to the threshold (for example, a one-time sample). In other implementations, the iterative procedure stops when successive iterations display an oscillatory character, for example, when the alignment or the traces worsen. The latter can happen when noise is being inverted. In other implementations, the threshold is selected by a user. Step 320 is performed for each XYO bin and for each trace of the collection of seismic traces within each XYO bin. Responsive to determining that the surface-consistent residual static correction is greater than the threshold, the computer system applies the surface-consistent residual static correction to each seismic trace in an iterative manner. A new pilot trace is evaluated for each XYO bin (XYO gather) and the process is iterated until the inverted surface-consistent residual statics updates are zero or less than the pre-defined threshold. The most accurate pilot trace representation expressing the average normalized stack of the seismic traces in the XYO gather is can be obtained using equation (1) as follows.

$$\tilde{W}'(t) = \frac{1}{N_b} \sum_{b=1}^{N_b} \tilde{P}'_b(t) \qquad (1)$$

In equation (1), $\tilde{W}'(t)$ denotes the XYO gather average response (pilot trace), $\tilde{P}'_b(t)$ denotes the trace in an XYO gather, and the index b denotes each of the $N_b$ traces of a specific XYO gather. The index b is directly related to the source and receiver indices couple: (i,j)→b. In the inverting for surface-consistency at each iteration, the time shift corrections for each seismic trace are regularized across the entire seismic survey to ensure robustness and redundancy. The iterations are performed to generate updated surface-consistent time shifts and updated pilot traces until the time correction is null or cannot further decrease, and the pilot trace provided represents all the other seismic traces in the XYO gather.

In step 324, responsive to determining that the surface-consistent residual static correction is less than the threshold, the computer system stacks the collection of seismic traces within each XYO bin to provide the pilot trace for that XYO bin. Step 324 is performed for each XYO bin and for each trace of the collection of seismic traces within each XYO bin. The repetition of the process illustrated in FIG. 3 for each XYO bin results in the generation of a virtual shot gather for the XY midpoint position. Since each seismic trace in the virtual shot gather is the result of a stacking process, the signal-to-noise (S/N) ratio is increased by making coherent signals stronger and uncorrelated signal (noise) weaker.

In step 328, the computer system groups the pilot traces for the multiple XYO bins into multiple virtual shot gathers. Each virtual shot gather includes a collection of pilot traces having the same X and Y coordinates and different O coordinates. Thus, the process is repeated for all the available offsets to reconstruct a full virtual shot gather including a combination of all the pilot traces. The full virtual shot gather is an expression of a virtual shot gather at a given XY midpoint position. The artificially reconstructed pre-stack gather resembles the seismic shot gather at a surface position, consistent with the XY midpoint position, with increased accuracy and a greater S/N ratio.

In step 332, the computer system performs 1D FWI based on each virtual shot gather of the multiple virtual shot gathers. The computer system further determines a subsurface velocity model based on the 1D FWI.

In some implementations, the computer system performs the 1D Laplace-Fourier FWI based on the virtual shot gather to obtain a 1D velocity-depth function corresponding to the XY midpoint position. The computer system can also use other FWI implementations, such as in the time-domain or frequency-domain. The process illustrated in FIG. 3. provides increased-resolution velocity functions that are compiled in a pseudo-3D velocity model. In some implementations, accurate FWI models of the near surface can be obtained in less time. The near surface velocity modeling is further used for seismic exploration and reservoir characterization of oil and gas resources on land and in water.

Figure 4:
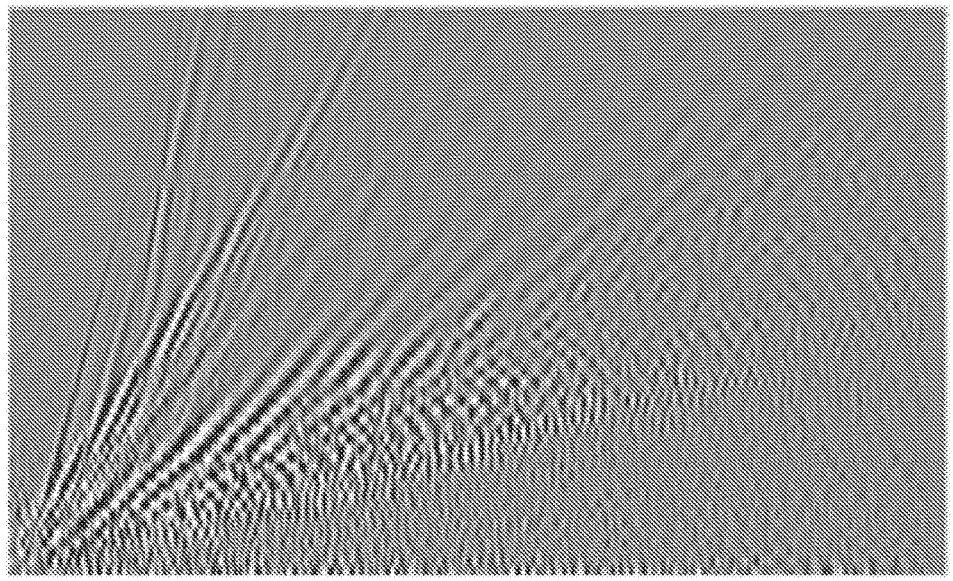
FIG. 4 illustrates an example shot gather compared to a virtual shot gather.
Figure 4:
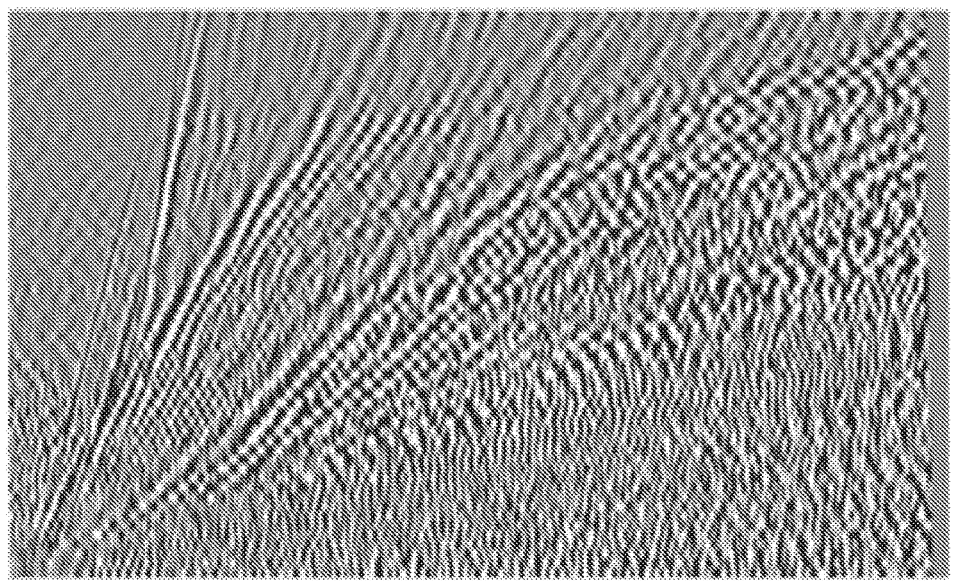

FIG. 4 illustrates an example shot gather compared to a virtual shot gather. In FIG. 4, the shot gather has a shot point located at the XY midpoint coordinates. The shot gather is compared to a virtual shot gather pertaining to the same XY midpoint position and reconstructed using the process illustrated and described in more detail with reference to FIG. 3. The shot gather has a shot point located at the XY midpoint position of the virtual shot gather. The increase in the S/N ratio and the preservation of the seismic phases is illustrated in the virtual shot gather. The shot gather and the virtual shot gather illustrated in FIG. 4 demonstrate the manner in which the coherent signal is preserved while the uncorrelated noise is reduced to provides an increased S/N ratio.

Figure 5:
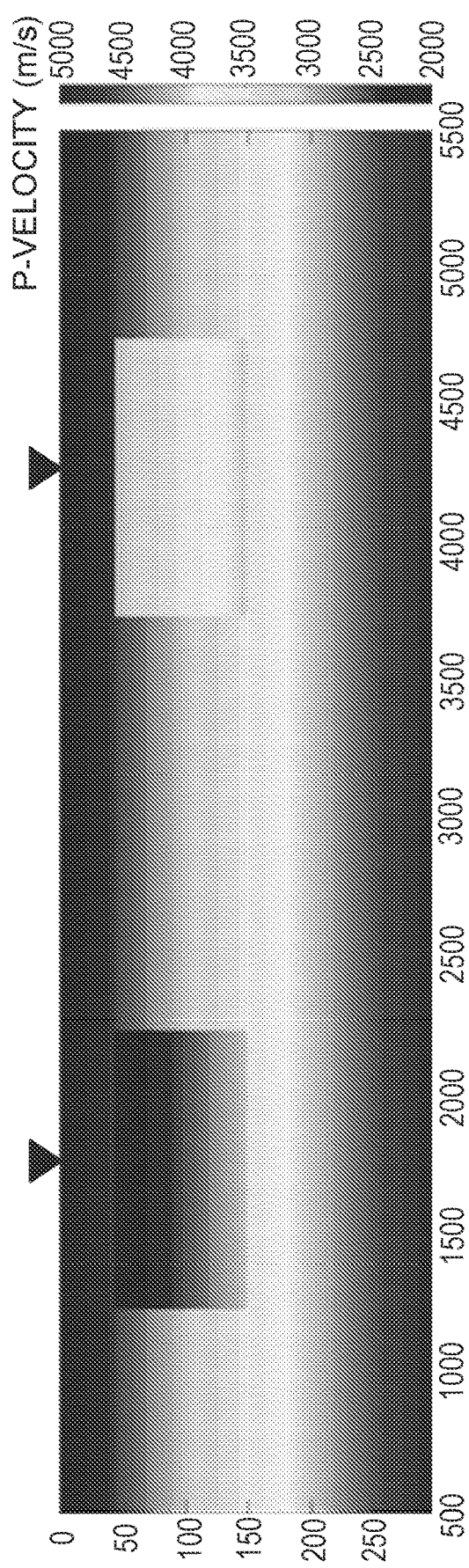
FIG. 5 illustrates an example cross-section of a three-dimensional (3D) velocity model.

FIG. 5 illustrates an example cross-section of a three-dimensional (3D) velocity model having two anomalies. The properties of the virtual shot gather at the XY midpoint are shown using a synthetic test in FIG. 5. A 3D model is generated encompassing a background velocity gradient and two anomalies having greater and lesser velocities relative to the background. Synthetic traces are generated using finite difference (FD) acoustic modeling. The corresponding process for generation of the virtual shot gathers is applied. The reconstructed virtual traces are visualized at different offsets at the XY midpoint positions shown in FIG. 5 corresponding to the lesser and greater velocity anomalies. The triangles in FIG. 5 show the positions of the virtual traces used for comparison to the FD-generated acoustic traces.

Figure 6A:
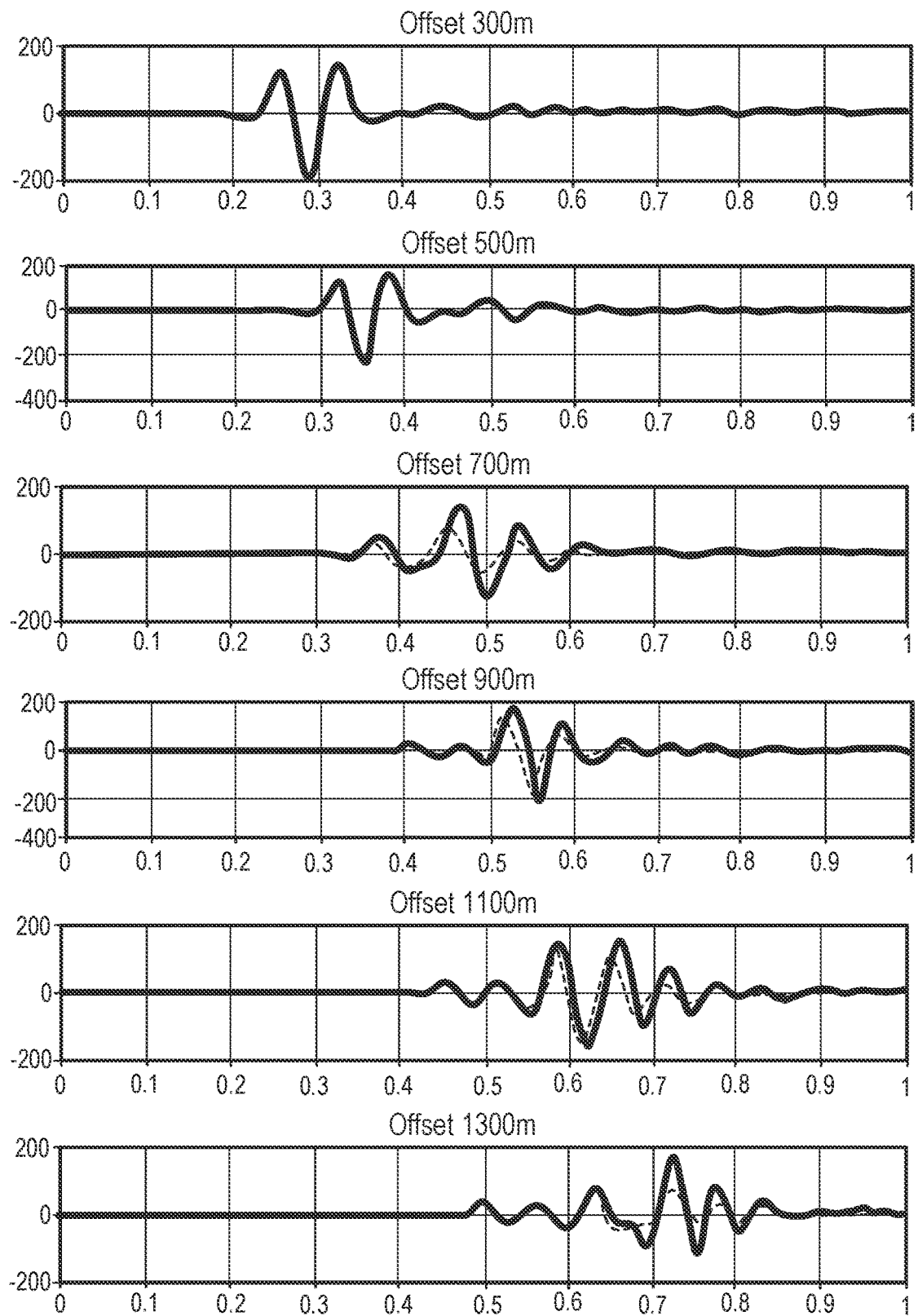
FIGS. 6A-B illustrate an example comparison of finite difference (FD)-generated acoustic traces to virtual traces.
Figure 6B:
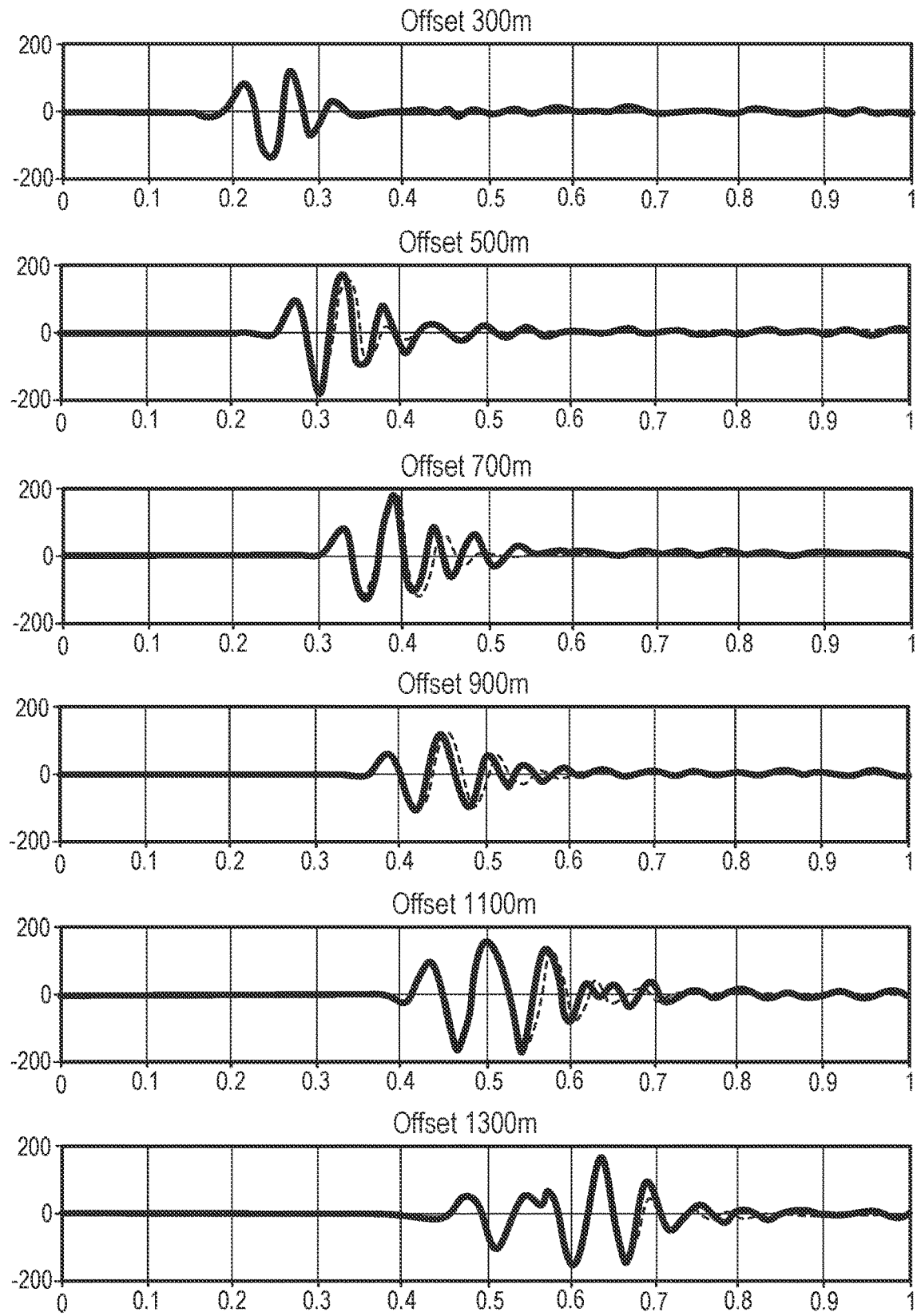

FIGS. 6A-B illustrate an example comparison of finite difference (FD) generated acoustic traces to virtual traces for a reduced velocity condition (FIG. 6A) and an increased velocity condition (FIG. 6B). The FD-generated acoustic traces are compared to virtual traces at the same or nearby surface positions. The traces from FD acoustic modeling are shown using solid lines while the reconstructed virtual traces are shown using dashed lines. The virtual traces are consistent with the traces. The waveforms characteristic of a 3D velocity distribution, as illustrated in more detail by the model in FIG. 5, can be represented by a virtual trace generated using the process illustrated and described in more detail with reference to FIG. 3. The traces are more similar with respect to the greater-velocity feature rather than the lesser-velocity feature since the greater-velocity feature is sampled by transmitted waves with a greater accuracy. The phase of the and virtual traces show consistency in both cases, meaning that both cases express the kinematics of the wave propagation, that is, the velocity.

Figure 7:
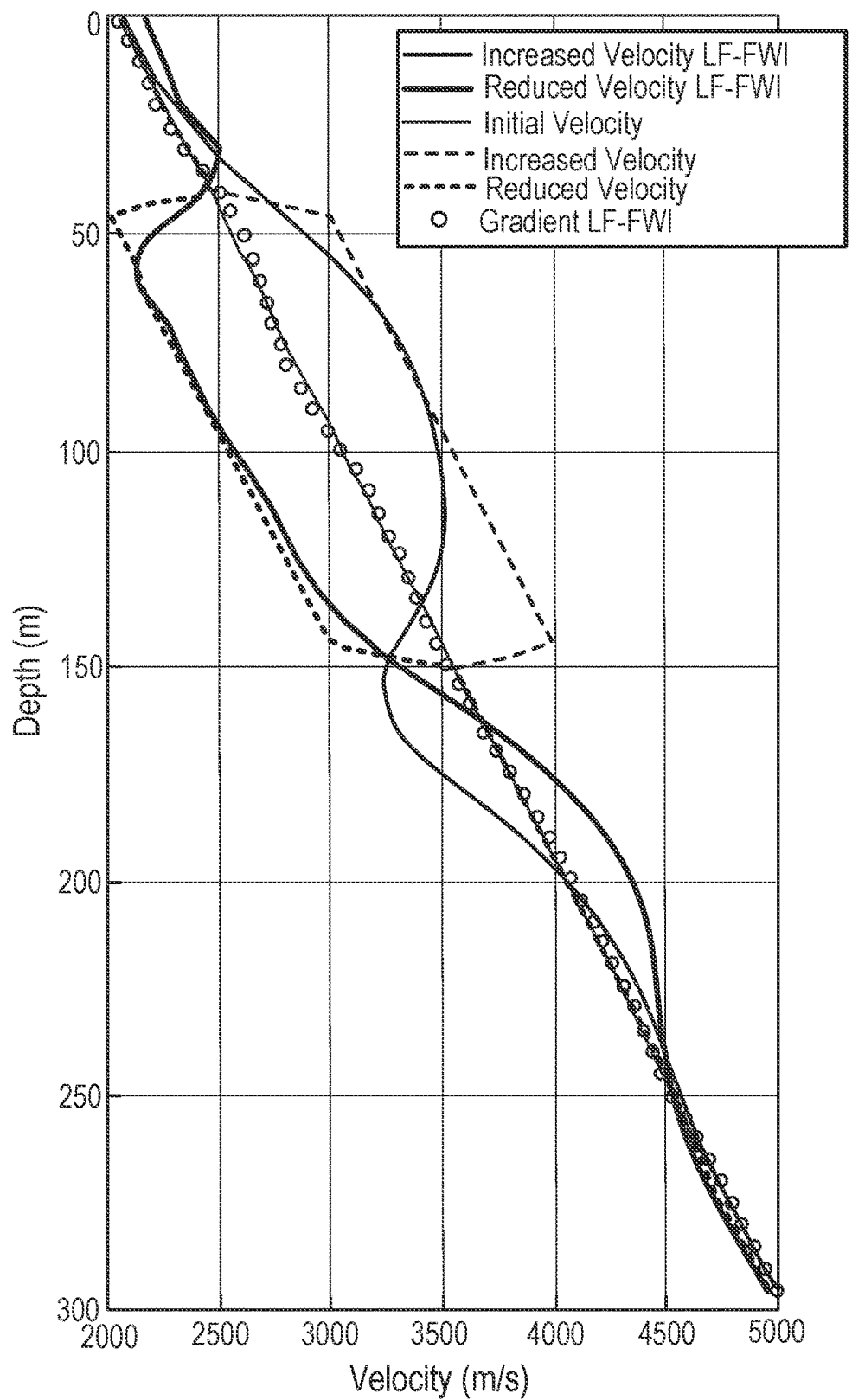
FIG. 7 illustrates example one-dimensional (1D) velocity functions and recovered velocities from a process of virtual shot gather creation and 1D FWI.

FIG. 7 illustrates example one dimensional (1D) velocity functions and recovered velocities from a process of virtual shot gather creation and 1D FWI. The results of the application of virtual shot gather 1D FWI in the XY midpoint domain is illustrated. In FIG. 7, 1D FWI is applied to the virtual shot gathers at the XY positions illustrated in FIG. 5 and corresponding to the lesser and greater velocity anomalies. The results illustrated in FIG. 7 indicate that the inversion process is able to recover the velocity anomalies and maintain stable results for the background gradient velocity.

The property that the virtual pre-stack gather resembles the seismic shot gather at a surface position consistent with the XY midpoint position with greater accuracy and greater S/N ratio enables the simplification of the 3D shot gather problem to a 1D virtual shot gather problem. The reduced dimensionality of the problem enables the application of FWI processes more efficiently than for full 3D propagation. The increase in the S/N ratio resulting from the generation of the virtual shot gathers further enables the application of FWI.

The virtual shot gathers are generated as follows. The $j^{th}$ offset bin of the $i^{th}$ column of the XYO hypercube is selected, and the seismic traces within are corrected for statics and summed. The process yields a pilot trace $y_{(i,j)}$ that also serves as the $j^{th}$ trace of the $i^{th}$ virtual shot gather. The $i^{th}$ column of the hypercube corresponds to the $i^{th}$ XY midpoint location. FWI is applied on each virtual source gather independently, to produce local 1D models, $m_i^{opt}(z)$, that depend only on depth, each characterizing the subsurface at the $i^{th}$ XY location. Recovering the 1D model is achieved by solving the optimization problem expressed in equation (2) as follows.

$$m_i^{opt}(z) = \mathrm{argmin}_{m_i(z)} \{ \Sigma_j \| y_{i,j} - f_{i,j}(m_i(z)) \| + L(m_i(z)) \} \quad (2)$$

In equation (2), $f_{i,j}(\bullet)$ denotes a function that models seismic data at the middle of the $j^{th}$ offset bin, using a wave equation that describes two-way propagation through a 1D medium determined by the model $m_i(z)$. In a 1D medium, the layers are horizontal and there is no lateral variation of velocity. $L(\bullet)$ denotes a regularization function that encodes prior information about the properties of the model. $\|\bullet\|$ denotes a selected measure of distance.

The function $f_{i,j}(\bullet)$ is not tied to a particular type of wave equation. The wave equation to be used (such as acoustic or elastic) can be determined by a user. Similarly, the disclosed FWI implementations are not tied to a particular data domain (such as the time domain, frequency domain, or the Laplace-Fourier domain). The implementations can accommodate any data domain by implementing $f_{i,j}(\bullet)$ such that the function models data in the same domain as the input data. Since $f_{i,j}(\bullet)$ involves propagation in a 1D medium, implementations that exploit the cylindrical symmetry around the z-axis are possible. The model $m_i(z)$ can take different forms, depending on the type and parameterization of the wave equation used. For example, when the acoustic wave equation is used, $m_i(z)$ contains compressional velocities and densities.

Figure 8:
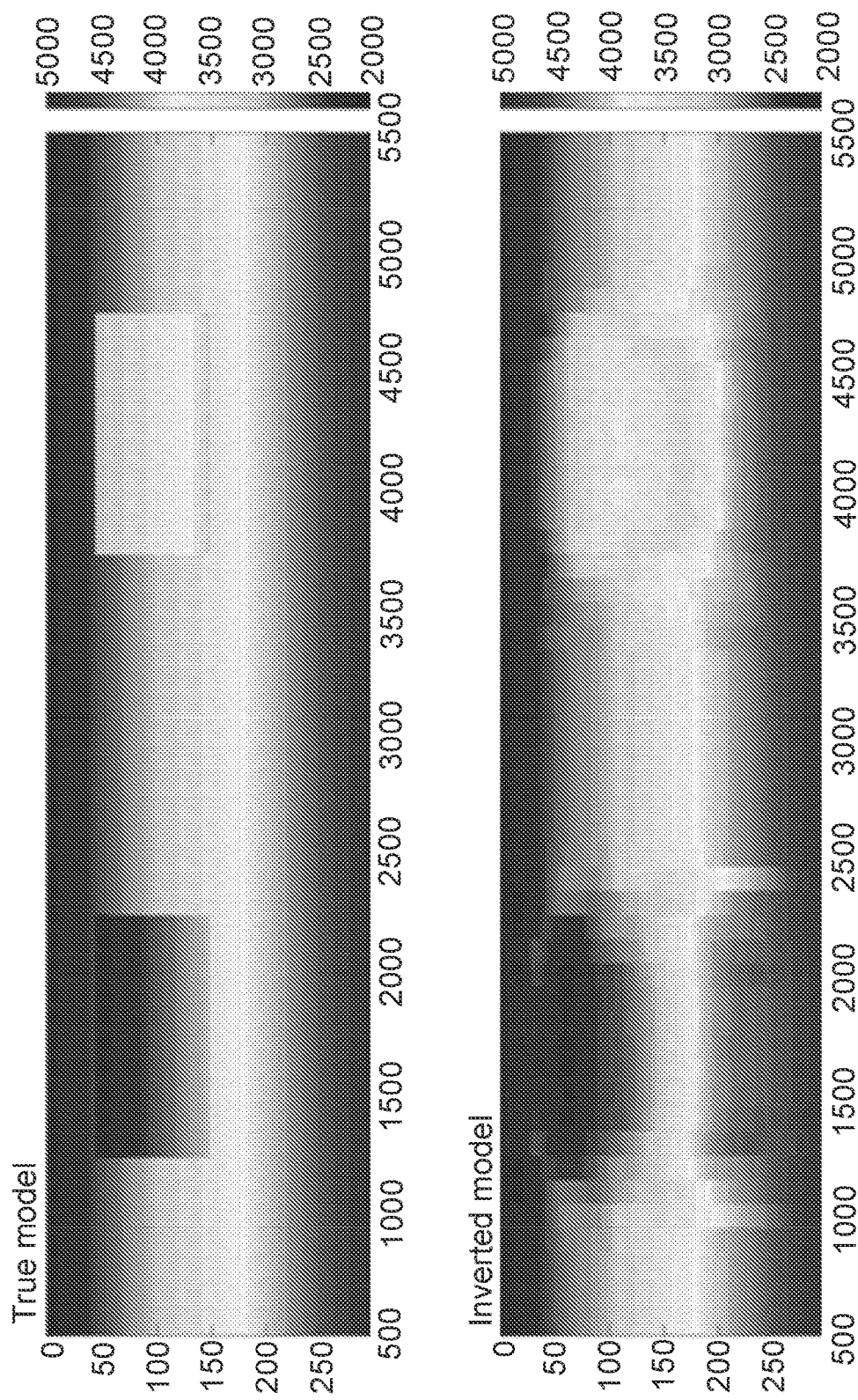
FIG. 8 illustrates an example 1D approximation of 3D seismic propagation using virtual shot gather processing and XY midpoint 1D FWI.
Figure 9:
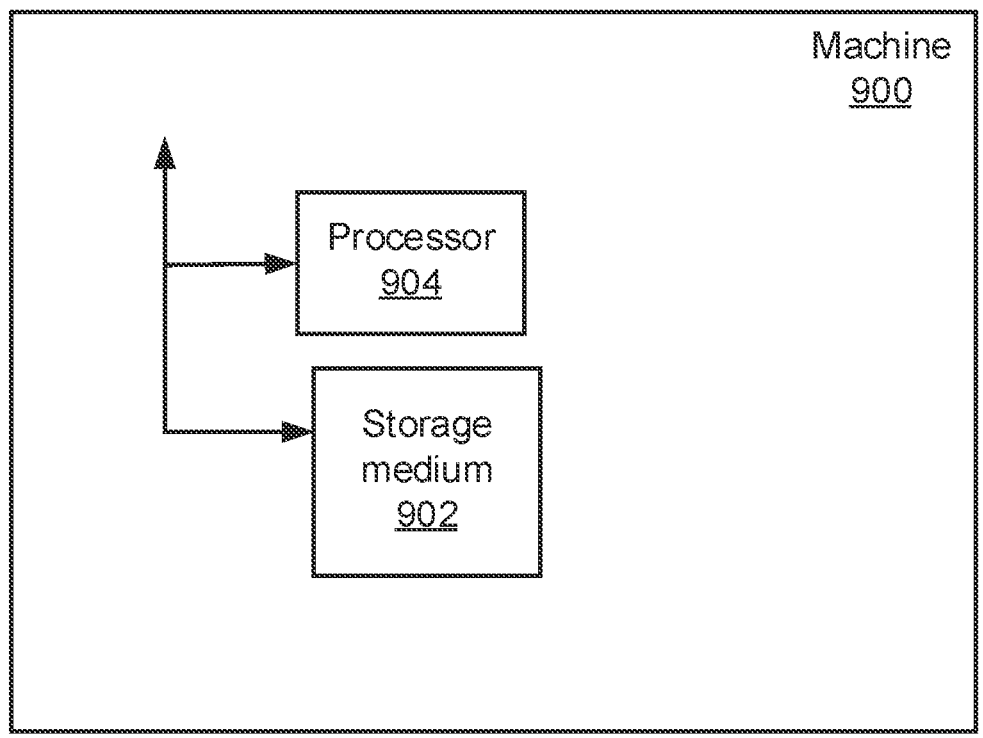

FIG. 8 illustrates an example 1D approximation of 3D seismic propagation using virtual shot gather processing and XY midpoint 1D FWI. The complex 3D velocity distribution of FIG. 5 can be recovered using the virtual shot gather and 1D FWI approximations, as illustrated in FIG. 8.

The methods described can be performed in any sequence or in any combination and the components of respective implementations may be combined in any manner. The machine-implemented operations described above can be implemented by a computer system, programmable circuitry, configured by software or firmware, or entirely by special-purpose (hardwired) circuitry, or by a combination of such forms. Such special-purpose circuitry (if any) can be in the form of, for example, one or more application-specific integrated circuits, programmable logic devices, field-programmable gate arrays, or system-on-a-chip systems.

Software or firmware to implement the techniques introduced here may be stored on a machine-readable storage medium 902 and may be executed by one or more general-purpose or special-purpose programmable microprocessors 904. A machine-readable medium 902, as the term is used herein, includes any mechanism that can store information in a form accessible by a machine 900 (a machine may be, for example, a computer, network device, cellular phone, personal digital assistant, manufacturing tool, or any device with one or more processors). For example, a machine-accessible medium includes recordable or non-recordable media (for example, RAM or ROM, magnetic disk storage media, optical storage media, or flash memory devices).

The term logic, as used herein, means special-purpose hardwired circuitry, such as one or more application-specific integrated circuits, programmable logic devices, field programmable gate arrays, or other similar devices, programmable circuitry programmed with software or firmware, such as one or more programmed general-purpose microprocessors 904, digital signal processors or microcontrollers, system-on-a-chip systems, or other similar devices, or a combination of the forms.

What is claimed is:

1. A method comprising:
sorting, by a computer system, a plurality of seismic traces into a plurality of common midpoint-offset bins;
for each common midpoint-offset bin of the plurality of common midpoint-offset bins:
applying, by the computer system, a linear moveout correction to a collection of seismic traces within the common midpoint-offset bin;
stacking, by the computer system, the collection of seismic traces to form a pilot trace;
determining, by the computer system, a surface-consistent residual static correction for each seismic trace of the collection of seismic traces;
comparing, by the computer system, the surface-consistent residual static correction for each seismic trace to a threshold;
responsive to determining, based on the comparing, that the surface-consistent residual static correction is less than the threshold, stacking, by the computer system, the collection of seismic traces to provide the pilot trace;
responsive to determining, based on the comparing, that the surface-consistent residual static correction is greater than the threshold,
applying, by the computer system, the surface-consistent residual static correction to each seismic trace; and
generating, based on the applying, an updated pilot trace representing the collection of seismic traces within the common midpoint-offset bin, the updated pilot trace replacing the pilot trace; and
grouping, by the computer system, the pilot traces for the plurality of common midpoint-offset bins into a plurality of virtual shot gathers.

2. The method of claim 1, further comprising:
performing, by the computer system, one-dimensional full waveform inversion based on each virtual shot gather of the plurality of virtual shot gathers; and
determining, by the computer system, a subsurface velocity model based on the one-dimensional full waveform inversion.

3. The method of claim 1, wherein each virtual shot gather of the plurality of virtual shot gathers comprises a collection of pilot traces having same X and Y coordinates and different offset coordinates.

4. The method of claim 1, wherein the determining of the surface-consistent residual static correction comprises:
determining, by the computer system, a time shift based on cross-correlation of each seismic trace with the pilot trace; and
providing, by the computer system, the surface-consistent residual static correction based on inversion of the time shift for a seismic source position and a seismic receiver position.

5. The method of claim 1, wherein a size of the linear moveout correction increases as a size of each common midpoint-offset bin increases.

6. The method of claim 1, wherein the collection of seismic traces is obtained from recorded seismic energy travel from a plurality of seismic sources to a plurality of seismic receivers during a seismic survey, and wherein dimensional offsets of the plurality of seismic receivers comprise at least one of:
- a common midpoint X axis of the seismic survey;
- a common midpoint Y axis of the seismic survey;
- an offset axis; or
- an azimuth axis.

7. The method of claim 1, further comprising
generating the updated pilot traces for each plurality of common midpoint-offset bins; and
based on the updated pilot traces, regularizing time shift corrections for each seismic trace of the plurality of seismic traces.

8. A non-transitory computer-readable storage medium storing instructions executable by a computer system, the instructions when executed by the computer system cause the computer system to:
sort a plurality of seismic traces into a plurality of common midpoint-offset bins;
for each common midpoint-offset bin of the plurality of common midpoint-offset bins:
apply a linear moveout correction to a collection of seismic traces within the common midpoint-offset bin;
stack the collection of seismic traces to form a pilot trace;
determine a surface-consistent residual static correction for each seismic trace of the collection of seismic traces;
compare the surface-consistent residual static correction for each seismic trace to a threshold;
responsive to determining, based on the comparing, that the surface-consistent residual static correction is less than the threshold, stack the collection of seismic traces to provide the pilot trace;
responsive to determining, based on the comparing, that the surface-consistent residual static correction is greater than the threshold,
apply the surface-consistent residual static correction to each seismic trace; and
generate, based on the applying, an updated pilot trace representing the collection of seismic traces within the common midpoint-offset bin, the updated pilot trace replacing the pilot trace; and
group the pilot traces for the plurality of common midpoint-offset bins into a plurality of virtual shot gathers.

9. The non-transitory computer-readable storage medium of claim 8, wherein the instructions further cause the computer system to:
perform one-dimensional full waveform inversion based on each virtual shot gather of the plurality of virtual shot gathers; and
determine a subsurface velocity model based on the one-dimensional full waveform inversion.

10. The non-transitory computer-readable storage medium of claim 8, wherein each virtual shot gather of the plurality of virtual shot gathers comprises a collection of pilot traces having same X and Y coordinates and different offset coordinates.

11. The non-transitory computer-readable storage medium of claim 8, wherein the determining of the surface-consistent residual static correction comprises:
determining a time shift based on cross-correlation of each seismic trace with the pilot trace; and
providing the surface-consistent residual static correction based on inversion of the time shift for a seismic source position and a seismic receiver position.

12. The non-transitory computer-readable storage medium of claim 8, wherein a size of the linear moveout correction increases as a size of each common midpoint-offset bin increases.

13. The non-transitory computer-readable storage medium of claim 8, wherein the respective collection of seismic traces is obtained from recorded seismic energy travel from a plurality of seismic sources to a plurality of seismic receivers during a seismic survey, and wherein dimensional offsets of the plurality of seismic receivers comprise at least one of:
- a common midpoint X axis of the seismic survey;
- a common midpoint Y axis of the seismic survey;
- an offset axis; or
- an azimuth axis.

14. A computer system comprising:
one or more computer processors; and
a non-transitory computer-readable storage medium storing instructions executable by the one or more computer processors, the instructions when executed by the one or more computer processors cause the one or more computer processors to:
sort a plurality of seismic traces into a plurality of common midpoint-offset bins;
for each common midpoint-offset bin of the plurality of common midpoint-offset bins:
apply a linear moveout correction to a collection of seismic traces within the common midpoint-offset bin;
stack the collection of seismic traces to form a pilot trace;
determine a surface-consistent residual static correction for each seismic trace of the collection of seismic traces;
compare the surface-consistent residual static correction for each seismic trace to a threshold;
responsive to determining, based on the comparing, that the surface-consistent residual static correction is less than the threshold, stack the collection of seismic traces to provide the pilot trace;
responsive to determining, based on the comparing, that the surface-consistent residual static correction is greater than the threshold,
apply the surface-consistent residual static correction to each seismic trace; and
generate, based on the applying, an updated pilot trace representing the collection of seismic traces within the common midpoint-offset bin, the updated pilot trace replacing the pilot trace; and
group the pilot traces for the plurality of common midpoint-offset bins into a plurality of virtual shot gathers.

15. The computer system of claim 14, wherein the instructions further cause the one or more computer processors to:
perform one-dimensional full waveform inversion based on each virtual shot gather of the plurality of virtual shot gathers; and
determine a subsurface velocity model based on the one-dimensional full waveform inversion.

16. The computer system of claim 14, wherein each virtual shot gather of the plurality of virtual shot gathers comprises a collection of pilot traces having same X and Y coordinates and different offset coordinates.

17. The computer system of claim 14, wherein the determining of the surface-consistent residual static correction comprises:
determining a time shift based on cross-correlation of each seismic trace with the pilot trace; and providing the surface-consistent residual static correction based on inversion of the time shift for a seismic source position and a seismic receiver position.

18. The computer system of claim 14, wherein a size of the linear moveout correction increases as a size of each common midpoint-offset bin increases.

* * * * *